United States Patent Office 3,734,900
Patented May 22, 1973

3,734,900
POLYMERIZATION OF CONJUGATED DIOLEFINS
Morford C. Throckmorton, Akron, Ohio, assignor to The
Goodyear Tire & Rubber Company, Akron, Ohio
No Drawing. Filed July 8, 1970, Ser. No. 53,294
Int. Cl. C08d 1/14, 1/20, 3/08
U.S. Cl. 260—94.3       7 Claims

ABSTRACT OF THE DISCLOSURE

There is disclosed a method for the polymerization of butadiene or butadiene in mixture with other diolefins such as isoprene, 2-ethyl butadiene, 2,3-dimethyl butadiene and the like, with a catalyst system comprising (1) an organometallic compound in which the metal is from Groups I, II and III of the Periodic System, (2) a nickel compound from the group of carboxylic acid salts of nickel, organic complex compounds of nickel or nickel carbonyls, (3) a fluorine containing compound from the group of metal fluorides and complexes thereof and (4) a compound containing a hydroperoxide group. The polymers contain a high proportion of cis 1,4 content and find use as synthetic rubbers in such products as tires and tire treads.

---

This invention is directed to methods of polymerizing butadiene and butadiene in mixture with other diolefins to form polymers having a high content of cis 1,4 addition. It is also directed to catalyst systems useful for this purpose.

Polymers of butadiene or butadiene in mixture with other diolefins containing a high proportion of the butadiene units in the cis 1,4 configuration possess properties which make them useful as synthetic rubbers.

It is an object of this invention to provide a method whereby butadiene can be polymerized to a high content of cis 1,4-polybutadiene. Another object is to provide a catalyst system by which these polymerizations may be accomplished. Another object is to form copolymers of isoprene or other diolefins and butadiene in which the polybutadiene segment has a high content of cis 1,4-structure. Other objects will become apparent as the description proceeds.

According to the invention, butadiene or butadiene in mixture with other diolefins, such as isoprene, 2-ethyl butadiene, piperylene, 2,3-dimethyl butadiene, and the like is polymerized by contact with a catalyst system comprising (1) an organometallic compound in which the metal is of Groups I, II and III of the Periodic Table, (2) at least one nickel compound from the group of carboxylic acid salts of nickel, organic complex compounds of nickel or nickel carbonyl, (3) a fluorine-containing compound from the group of metal fluorides and complexes of the metal fluorides and (4) a compound containing a hydroperoxide (—OOH) group.

The organometallic compounds useful in this invention are organocompounds of such metals as lithium, sodium, potassium, rubidium, cesium, magnesium, calcium, strontium, beryllium, barium, zinc, cadmium, aluminum, gallium and indium. By the term "organometallic" is meant alkyl cycloalkyl, aryl, arylalkyl, alkaryl radicals are attached to the metal to form the organo compound of the particular metal.

Of the organometallic compounds useful in this invention, it is preferred to use organoaluminum compounds, organomagnesium compounds, organozinc compounds and organolithium compounds.

By the term "organoaluminum compound" is meant any organoaluminum compound responding to the formula:

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride and benzylisopropylaluminum hydride and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen and $a$ and $b$ are mole fractions whose sum equals 2 while the ratio of $a/b$ is greater than 2 but not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also "organomagnesium compounds" means any organomagnesium compound or any organomagnesium halide of the Grignard type corresponding to the formulas $R_2Mg$ or RMgY where R may be alkyl, aryl, arylalkyl or alkaryl and Y is fluorine, or R'R''Mg where R' may be alkyl, aryl or alkaryl and R'' may be either alkyl, aryl, arylalkyl or alkaryl. Representative among the compounds responding to these formulae are diethylmagnesium, dipropylmagnesium, ethyl-magnesium fluoride and phenylmagnesium fluoride.

By the term "organozinc compound" is meant any organozinc compound responding to the formula $R_2Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R–Li where R is an alkyl, alkaryl, arylalkyl or aryl group. Representative among the compounds responding to the formula set forth above are ethyllithium, propyllithium, n-, sec- or t-butyllithium, hexyllithium, styryllithium or phenyllithium. Also, the organolithium-aluminum compounds may be used. These compounds respond to the formula $R'R''_3LiAl$ where R' and R'' may be alkyl, alkaryl or aryl-alkyl groups and R' and R'' may or may not be the same group. Representative of these compounds are n-butyltriisobutyllithium aluminum, tetrabutyllithium aluminum, butyltriethyllithium aluminum, tetraisobutyllithium aluminum and styryltrinormalpropyllithium aluminum.

Representative of other organometallic compounds which may be employed in this invention are sodium, potassium, calcium, beryllium, cadmium and mercury alkyls, alkaryls, arylalkyls and aryls.

The component of the catalyst of this invention which contains nickel may be any organonickel compound. It is preferred to employ a soluble compound of nickel. These soluble nickel compounds are usually compounds of nickel with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt of an organic acid containing from about 1 to 20 carbon atoms may be employed. Representative of such organo-nickel compounds are nickel benzate, nickel acetate, nickel naphthenate, bis(alpha furyl dioxime) nickel, nickel octanoate, nickel palmitate, nickel stearate, nickel acetylacetonate, bis(salicylaldehyde) ethylene diimine nickel and nickel salicaldehyde. Nickel tetracarbonyl also may be employed as the nickel containing catalyst in this invention. The preferred component containing nickel is a nickel salt of carboxylic acid or an organic complex compound of nickel.

The third component of the catalyst is a fluorine-containing compound from the group of several metal fluorides and complexes thereof, as represented by boron trifluoride, boron trifluoride diethyl etherate, boron trifluoride di-n-butyl-etherate, boron trifluoride ethyl acetate complex, boron trifluoride benzaldehyde complex, boron trifluoride acetone complex, boron trifluoride benzonitrile complex, boron trifluoride ethyl alcoholate, boron trifluoride phenolate, tributyltin fluoride, molybdenum hexafluoride, tungsten hexafluoride, stannic fluoride, titanium tetrafluoride, antimony trifluoride and the like.

The fourth catalyst component is a hydroperoxide-containing compound, represented by the formula R—O—O—H. R may be either hydrogen or an alkyl, alkenyl, alkynyl, cycloalkyl, aryl, aralkyl or alkaryl group. When R is a hydrocarbon group, this fourth catalyst component may be dihydroperoxide, as

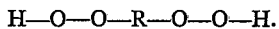

H—O—O—R—O—O—H.

Representative examples of hydroperoxides are hydrogen peroxide, ethyl hydroperoxide, tertiary-butyl hydroperoxide, 1,1 - dimethyl - 2 - propynyl hydroperoxide, 1-methylcyclopentyl hydroperoxide, cyclohexene hydroperoxide, ethylbenzene hydroperoxide, cumene hydroperoxide, diisopropylbenzene hydroperoxide, paramenthane hydroperoxide, decalin hydroperoxide, tetralin hydroperoxide, 1,4-dihydronaphthalene hydroperoxide, triphenylmethyl hydroperoxide, diisopropylbenzene dihydroperoxide and the like.

The catalyst component may be charged separately in either stepwise or simultaneous addition to the polymerization system or they may be mixed with one another in an inert solvent and this "preformed" catalyst can then be added to the monomer-solvent polymerization system.

Furthermore, the catalyst components may be mixed together or "preformed" in the presence of catalytic amounts of conjugated diolefins such as butadiene-1,3; isoprene; 2,3-dimethylbutadiene-1,3; pentadiene-1,3; 2-methylpentadiene-1,3 and the like. Preformed catalysts which are prepared in the presence of small amounts of conjugated diolefins under certain specific conditions are superior catalysts in that they have enhanced polymerization activities, are more soluble in hydrocarbon solvents and retain their high catalytic activity for long periods of time. The order of addition of the catalyst components and the temperature and length of reaction time all are important factors in preparing the preformed catalysts. It is preferable to have the conjugated diolefin present before the organometallic compound containing the Group I, II or III element (for example, triethylaluminum) and the nickel-containing compound are mixed together. It also generally is desirable to have the conjugated diolefin present before the organo-metallic compound containing the Group I, II or III element and the fluorine containing compound are mixed together. As an example of one of several preferred orders for catalyst mixing, components may be added in the following order: (1) inert solvent, (2) organometallic compound containing the Group I, II or III elements, (3) conjugated diolefin, (4) nickel compound, (5) fluorine containing compound and (6) hydroperoxide. This produces a highly active preformed catalyst. The preformed catalyst may also be pre-aged at a temperature between about 5° C. and about 95° C., preferably between about 20° C. and about 70° C. The aging time varies according to the other conditions but it generally is for several minutes to several hours.

The catalyst system of this invention has shown polymerization activity over a wide range of catalyst concentrations and catalyst ratios. The catalyst components inter-react to form the active catalyst. As a result, the optimum concentration for any one catalyst is dependent upon the concentration of each of the other catalyst components. While polymerization will occur over a wide range of catalyst concentrations and ratios, polymers having the most desirable properties are obtained over a narrower range. Polymerization will occur while the mole ratio of the organometallic compound (Me) to the nickel compound (Ni) ranges from about 0.3/1 to about 300/1, and when the mole ratio of the fluorine containing compound (F) to the nickel compound (Ni) ranges from about 1/1 to about 900/1, and while the mole ratio of the organometallic compound (Me) to the fluorine containing compound (F) ranges from about 0.1/1 to about 4/1. The mole ratio of the hydroperoxides (HP) to the organometallic compound (Me) may range from about 0.01/1 to about 3/1 while the mole ratio of the hydroperoxide to the nickel compound may range from about 0.1/1 to about 60/1. The mole ratio of the catalytic amount of conjugated diolefin (CD) to the nickel compound (Ni) ranges from about 0.5/1 to about 3000/1.

The preferred Me/Ni mole ratio ranges from about 1/1 to about 150/1; the preferred F/Ni mole ratio ranges from about 3/1 to about 400/1; and the preferred Me/Fe mole ratio ranges from about 0.3/1 to about 3/1. The preferred HP/Me mole ratio ranges from about 0.02/1 to about 1.5/1 and the preferred HP/Ni mole ratio ranges from about 0.3/1 to about 30/1. The preferred CD/Ni mole ratio ranges from about 5/1 to about 1000/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, heptane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the practice of this invention have not been found to be critical and may vary from a low temperature such as −10° C. or below up to high temperatures of 100° C. or higher. However, a more desirable temperature range is between about 30° C. and about 90° C. Ambient pressures are usually used but higher or lower pressures may be employed.

The practice of this invention is further illustrated by reference to the following examples which are intended to be representative rather than restrictive of the scope of this invention. Unless otherwise noted, all parts and percentages are by weight. The dilute solution viscosities (DSV) shown have been determined in toluene at 30° C.

EXAMPLE I

A purified butadiene in benzene solution containing 100 grams of butadiene per liter of solution was charged to a number of 4-ounce bottles. "In situ" addition of the catalyst components was made to each bottle of premix, charging catalysts in the order (1) triethylaluminum (TEAL), (2) nickel octanoate (Ni Oct), (3) $BF_3 \cdot Et_2O$ and (4) cumene hydroperoxide (CHP). Increasing amounts of CHP were added to successive bottles in the series. The polymerizations were carried out by tumbling the sealed bottles in a water bath at 50° C. The polymerizations were stopped, generally after 2 hours, by the addition of one part per hundred of monomer (phm.) of both a resin acid and an antioxidant. The polymers were dried to constant weight under a vacuum of about 29 inches of mercury. The results are summarized in Table I.

TABLE I.—EFFECT OF CUMENE HYDROPEROXIDE ON BUDENE NA POLYMERIZATION

Catalyst: TEAL/NiOct/$BF_3 \cdot Et_2O$ = 0.85/0.05/0.75 millimole/100 g. Bd
Polymerization conditions; 50° C., 2 hours, benzene solvent

| CHP, mmole/100 g. Bd | Polymer yield, wt. percent | DSV, dl./g. |
| --- | --- | --- |
| 0 (control) | 54 | 2.35 |
| 0.025 | 62 | 2.39 |
| .05 | 69 | 2.44 |
| .10 | 75 | 2.68 |
| .20 | 79 | [1] ND |
| .30 | 76 | 2.86 |
| .50 | 0 | |
| .50 (18 hours) | 58 | 3.9 |

[1] ND = Not determined.

EXAMPLE II

The experimental procedure was the same as that utilized in Example I except that CHP was the first catalyst component injected "in situ" into the premix in the instance, whereas it was the fourth component added in Example I. When 0.05 and 0.10 millimole CHP/100 g. Bd were added first, the polymer yields after 2 hours were 69 and 75 percent respectively, or identical to the yields obtained when similar amounts of CHP were added as the last component. The DSV of the polymers were 2.56 (vs. 2.44) and 2.64 (vs. 2.68) which are well within the limits of reproducibility. Thus, the promotional effect of CHP upon the polymerization of butadiene was the same regardless of whether the CHP was added first or last when utilizing the "in situ" catalyst addition method.

EXAMPLE III

A series of experiments were conducted in the same manner as that of Example I except a variety of organic hydroperoxides were employed. The type of hydroperoxide and the results obtained are summarized in Table II.

TABLE II.—HYDROPEROXIDES AS CATALYST PROMOTERS FOR BUDENE NA

| Hydroperoxide [1] | R–O–O–H, mmole/100 g. Bd | Polymer yield, wt. percent | DSV, dl./g. | Cis-1,4-PBd, percent |
| --- | --- | --- | --- | --- |
| None (control) | | 54 | 2.3 | 97.2 |
| CHP | 0.10 | 75 | 2.7 | 97.3 |
| TBHP | .25 | 74 | 2.4 | 97.1 |
| DIBHP | .25 | 77 | 3.8 | NA [2] |
| PMHP | .25 | 73 | 3.3 | NA |
| $H_2O_2$ | .40 | 68 | 3.0 | 97.4 |

[1] CHP = Cumene hydroperoxide; TBHP = Tertiary-butyl hydroperoxide; DIBHP = Diisopropyl benzene hydroperoxide; PMHP = Paramenthane hydroperoxide; $H_2O_2$ = 30 percent hydrogen peroxide in aqueous solution.
[2] NA = Not analyzed.

EXAMPLE IV

The experimental procedure was similar to that used in Example I except that triisobutylaluminum (TIBAL) was used as the organometallic compound rather than TEAL, and some polymerizations were permitted to continue for 4 and 21 hours before stopping.

TABLE III

Catalyst = TIBAL + NiOct + $BF_3 \cdot Et_2O$ = 0.85/0.05/0.75 mmole/100 g. Bd

| CHP, mmole/100 g. Bd | Polymer yields, wt. percent, at— | | | DSV, dl./g. |
| --- | --- | --- | --- | --- |
| | 2 hrs. | 4 hrs. | 21 hrs. | |
| 0 (control) | 20 | 49 | 79 | 1.3 |
| 0.10 | 38 | 63 | 89 | 1.5 |
| 0.20 | 73 | 77 | 94 | 1.8 |
| 0.30 | 60 | [1] ND | ND | 3.4 |
| 0.50 | ND | ND | 53 | 4.2 |

[1] ND = Not determined.

EXAMPLE V

Preformed catalysts were prepared in the presence of butadiene monomer. The catalyst components were added at about 25° C. in the order (1) butadiene (Bd) solution in benzene, (2) TEAL, (3) NiOct, (4) $BF_3 \cdot Et_2O$ and (5) CHP. No CHP was added in some instances in order to prepare a control "preformed" catalyst. Aliquots of the "preformed" catalysts were injected into bottles containing the standard butadiene in benzene premix and polymerizations were conducted as described in Example I. The catalytic amount of butadiene charged in preparing the preformed catalysts was equivalent to a 300/1 mole ratio of Bd/Ni. The 300/1 Bd/Ni mole ratio was less than 1 percent of the 37,000/1 Bd/Ni ratio which existed when the catalyst was charged to the standard pre-mix, and so the polymer yields were not corrected for the small amount of butadiene added with the catalyst.

The effect of the presence of CHP in the preformed catalyst is summarized in Table IV below.

TABLE IV

| Example number | Preformed catalysts, mmole/100 g. Bd | | | | | Polymer yields, wt. percent at— | | DSV, dl./g. at 2 hrs. |
| --- | --- | --- | --- | --- | --- | --- | --- | --- |
| | Bd | TEAL | NiOct | $BF_3 \cdot Et_2O$ | CHP | 1 hr. | 2 hrs. | |
| 1 | 15 | 0.85 | 0.05 | 0.75 | 0.00 | 38 | 70 | 2.3 |
| 2 | 15 | 0.85 | 0.05 | 0.75 | 0.10 | 54 | 73 | 3.6 |
| 3 | 22.5 | 1.27 | 0.075 | 1.12 | 0.00 | 62 | 82 | 1.8 |
| 4 | 22.5 | 1.27 | 0.075 | 1.12 | 0.15 | 78 | 94 | 2.8 |

While certain representative embodiments and details have been shown for the purpose of illustrating the invention, it will be apparent to those skilled in this art that various changes and modifications may be made therein without departing from the spirit or scope of the invention.

What is claimed is:

1. A process for the polymerization of butadiene and butadiene in mixture with other conjugated diolefins to form polymers containing a high proportion of the butadiene units in the cis configuration comprising contacting butadiene and butadiene in mixture with other diolefins under polymerization conditions with a catalyst comprising (A) at least one material selected from the group consisting of (1) an organoaluminum compound of the formula:

$$AlR_1R_2R_3$$

wherein $R_1$ is selected from the group consisting of alkyl (including cycloalkyl), aryl, alkaryl, arylalkyl, hydrogen and fluorine, $R_2$ and $R_3$ being selected from the group consisting of alkyl (including cycloalkyl), aryl, alkaryl, alkoxy and arylalkyl, (2) an organomagnesium compound of the formulae:

(a) $R_aMgX_b$ (b) $R_2Mg$ (c) $RMgY$ wherein R is selected from the group consisting of alkyl, aryl, arylalkyl and alkaryl and X is a halogen, Y is fluorine and (a) and (b) are mole fractions whose sum equals 2 while the mole ratio of (a)/(b) is greater than 2 but not infinite, (3) an organozinc compound of the formula:

$$R_2Zn$$

wherein R is selected from the group consisting of alkyl, aryl, alkaryl and arylalkyl, (4) an organolithium compound of the formulae:

(a) RLi (b) $R'_4LiAl$ wherein R is selected from the group consisting of alkyl, alkaryl, arylalkyl and aryl and R' is selected from the group consisting of alkyl, alkaryl and arylalkyl, (B) at least one nickel compound selected from the group consisting of carboxylic acid salts of nickel, organic complex compounds of nickel and nickel carbonyl, (C) a fluorine containing compound selected from the group consisting of boron trifluoride, boron trifluoride diethyl-etherate, boron trifluoride di-n-butyl-etherate, boron trifluoride ethyl acetate complex, boron trifluoride benzaldehyde complex, boron trifluoride acetone complex, boron trifluoride benzonitrile complex, boron trifluoride ethyl alcoholate, boron trifluoride phenolate, tributyltin fluoride, molybdenum hexafluoride, tungsten hexafluoride, stannic fluoride, titanium tetrafluoride, antimony trifluoride, and (D) a compound containing a hydroperoxide group of the formulae:

(a) ROOH (b) HOOROOH wherein R is selected from the group consisting of hydrogen, alkyl, alkenyl, alkynyl, cycloalkyl, aryl, aralkyl and alkaryl, in which the mole ratio of the organoaluminum compound to the nickel compound ranges from about 1/1 to about 150/1, the mole ratio of the fluorine containing compound to the nickel containing compound ranges from about 3/1 to about 400/1, the mole ratio of the organoaluminum compound to the fluorine containing compound ranges from about 0.3/1 to about 3/1 and the mole ratio of the hydroperoxide compound to the organoaluminum compound ranges from about 0.0/1 to about 1.5/1.

2. A process according to claim 1 in which the compound containing a hydroperoxide group is an organic hydrocarbon soluble hydroperoxide.

3. A process according to claim 2 in which the hydroperoxide is selected from the group of tertiary butyl hydroperoxide, cumene hydroperoxide, diisopropylbenzene hydroperoxide and para menthane hydroperoxide.

4. A process according to claim 1 in which the organometallic compound is an organoaluminum compound.

5. A process according to claim 1 in which the mole ratio of the organometallic compound to the nickel compound ranges from about 0.3/1 to about 300/1 and in which the mole ratio of the fluorine compound to the nickel compound ranges from about 1/1 to about 900/1, the mole ratio of the organometallic compound to the fluorine containing compound ranges from about 0.1/1 to about 4/1, the mole ratio of the hydroperoxide compound to the organometallic compound ranges from about 0.01/1 to about 3/1 and the mole ratio of the hydroperoxide compound to the nickel compound ranges from about 0.1/1 to about 60/1.

6. A process according to claim 5 in which the catalyst is preformed in the presence of a conjugate diolefin and in which the amount of conjugated diolefin to the nickel compound ranges from about 0.5/1 to about 3000/1.

7. A process according to claim 5 in which the fluorine containing compound is from the group of boron trifluoride and boron trifluoride etherate complex.

References Cited

UNITED STATES PATENTS

| | | | |
|---|---|---|---|
| 2,868,772 | 1/1959 | Ray et al. | 260—94.9 |
| 3,024,227 | 3/1962 | Nowlin et al. | 260—94.9 |
| 3,525,729 | 8/1970 | Gaeth | 260—94.3 |
| 3,528,957 | 9/1970 | Throckmorton et al. | 260—94.3 |
| 3,300,463 | 1/1967 | De LaMare | 260—93.7 |

OTHER REFERENCES

Natta et al.: "Polymer Chemistry of Synthetic Elastomers" (Part II, pp. 617–621), Interscience Publishers, N.Y., 1969.

JOSEPH L. SCHAFER, Primary Examiner

W. F. HAMROCK, Assistant Examiner

U.S. Cl. X.R.

260—82.1; 252—429 R, 431 R